No. 649,411. Patented May 8, 1900.
I. H. JEWELL.
FILTER.
(Application filed Mar. 15, 1900.)
(No Model.)
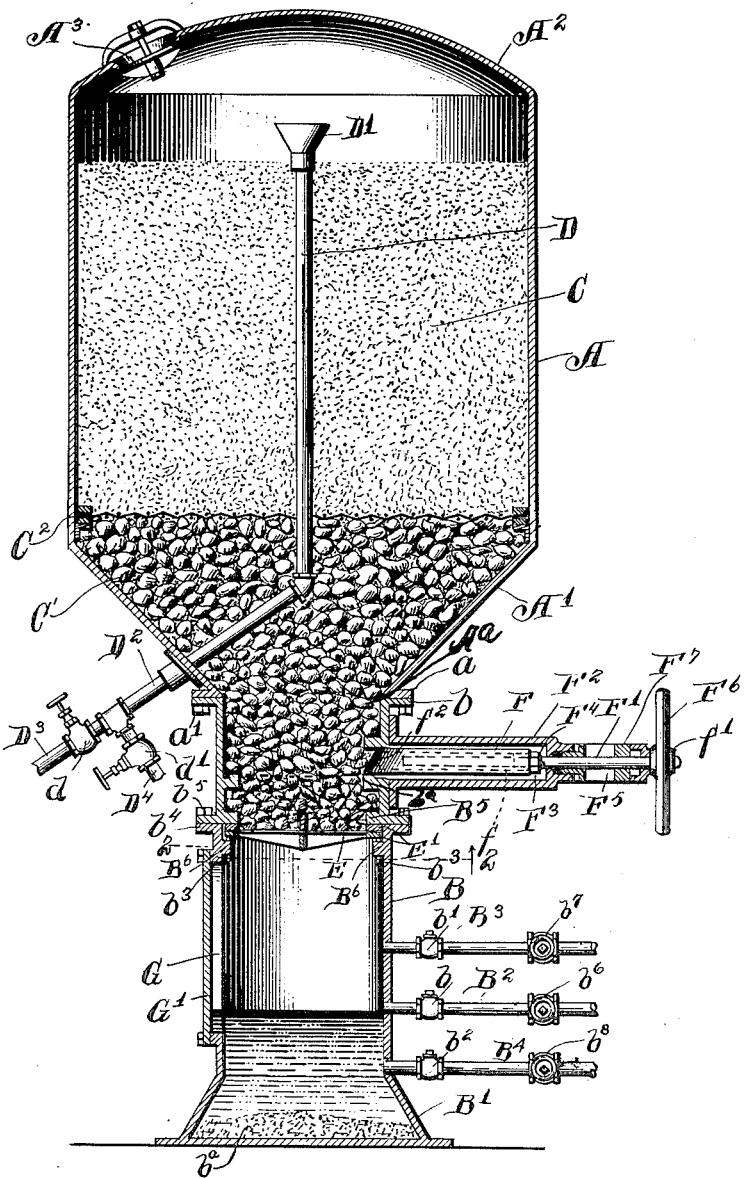
Fig. 1.
Fig. 2.
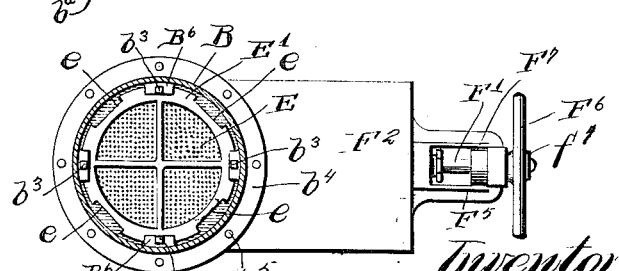
Witnesses:
Inventor:
Ira H. Jewell
by Poole & Brown
his Attorneys

UNITED STATES PATENT OFFICE.

IRA H. JEWELL, OF CHICAGO, ILLINOIS.

FILTER

SPECIFICATION forming part of Letters Patent No. 649,411, dated May 8, 1900.

Application filed March 15, 1900. Serial No. 8,789. (No model.)

*To all whom it may concern:*

Be it known that I, IRA H. JEWELL, of Chicago, in the county of Cook and State of Illinois, have invented certain new and useful Improvements in Filters; and I do hereby declare that the following is a full, clear, and exact description thereof, reference being had to the accompanying drawings, and to the letters of reference marked thereon, which form a part of this specification.

This invention relates to improvements in mechanical filters of that class embracing a tank, a granular filter-bed in said tank through which the water passes to free the same of impurities held therein, a screened opening or openings below the filter-bed through which the filtered water passes, and means below said screened opening or openings for disposing of the filtered water.

The object of the invention is to improve the construction and operation of such filters; and the invention consists in the matters hereinafter set forth, and more particularly pointed out in the appended claims.

In the drawings, Figure 1 is a central vertical section of the filter embodying my invention. Fig. 2 is a horizontal section looking upwardly, taken on line 2 2 of Fig. 1.

As shown in said drawings, A designates a tank which is herein shown as made cylindric and which contains the filter-bed, and B designates a hollow column for supporting said tank, provided at its lower end with a suitably-shaped base B', having a bottom wall $b^a$. The supporting-column B is in this instance made of considerably-less diameter than the tank A and, as herein shown, is made cylindric. Said column serves as a support for the tank A and filter-bed and is located below the discharge-opening $A^a$ of the tank in position to receive the filtered water as it passes from the bed and is connected with suitable pipes for the disposal of the water. Said tubular column also in the approved form contains the screen which supports parts of the granular filter-bed. Said tank is provided with a reduced portion A' at its lower end, herein shown as made conical, and the extreme lower end of said tank is made of the same size as the upper end of the column, and said lower end of the tank and upper end of the column are provided with annular radial flanges $a$ $b$, which are clamped together by means of bolts $a'$ in such manner as to afford a water-tight joint. The parts A A' of said tank may and desirably will be made of sheet metal and the column is desirably made of cast-iron. The tank is herein shown as closed at its upper end by an end wall $A^2$ and which is employed when the filter is of the pressure type. In case it is desired to construct a gravity-filter the said top wall $A^2$ is omitted. A suitable manhole-cover $A^3$ is provided in the top wall to afford access to the filter for the purpose of placing the filter-bed or other purpose. The filter-bed C occupies the greater portion of the tank A, but does not entirely fill the same.

D designates a vertical pipe located centrally of the bed, and projects above the same within the open space in the upper end of the tank and is provided at its upper end with a flaring or funnel-shaped mouth D'. The said pipe is directed at its lower end at an angle outwardly through the conical wall A' of the tank and is connected outside of said wall with a pipe $D^2$, which latter is connected at its end remote from the tank with a raw-water-inlet pipe $D^3$ and with a wash-water-outlet pipe $D^4$. Said pipes $D^3$ and $D^4$ are provided with valves $d$ $d'$. The pipe D serves when the filter is in operation to deliver the raw water to the top of the filter-bed, the valve $d$ at this time being open and the valve $d'$ being closed, and serves when the filter is being washed by reversing the filtered water upwardly through the bed to carry off the wash-water charged with the impurities dislodged from the bed. During this washing of the filter the valve $d$ in the pipe $D^3$ will be closed, while the valve $d'$ in the pipe $D^4$ will be open.

$B^2$ designates a pipe which is connected with the hollow base-column near the lower end thereof for carrying the pure or filtered water away from the filter. Said pipe $B^2$ desirably is connected with the column a distance above the bottom thereof, so that any sand escaping through the screen will fall to the bottom of the column and be trapped therein.

$B^3$ designates a wash-water-inlet pipe connected with the tubular base-column and through which the reverse washing-current is supplied to said tubular column.

$B^4$ designates an air-inlet pipe which leads into the tubular column-base near the lower end thereof and by which a current of air may be delivered to the filter-bed from below for the purpose of oxygenating the bed or for the purpose of aiding to agitate the bed when the same is being washed by any of the well-known means heretofore employed.

The pipes B², B³, B⁴ are provided, respectively, with check-valves $b$ $b'$ $b^2$ and with controlling-valves $b^6$ $b^7$ $b^8$, the former to prevent backflow of water in said pipes.

Near the upper end of the column, as herein shown, is located a screen E, which in the usual operation of the filter supports that part of the filter-bed which is located vertically thereover and through which the filtered water passes from the bed to the tubular interior of said column. Said screen is made of a diameter approximately equal to that of the column and is so arranged within the tubular column as to be readily accessible from the exterior thereof for the purpose of cleansing or renewing the screen, being in this respect similar to that shown in my prior United States Letters Patent No. 646,837, granted April 3, 1900. The screen is interposed between upper and lower clamping spiders or rings E' E', and said spiders are interposed between an upper annular inwardly-extending radial flange B⁵ and a plurality of radially-extending lugs B⁶, located below said flange. Set-screws $b^3$ pass upwardly through said lugs and impinge at their upper ends against the lower clamping-ring and act to clamp the rings tightly against the flange B⁵ and to afford a water-tight joint between the same. If found desirable, a packing-ring may be interposed between said screen-rings and said flange B⁵.

In order to facilitate the insertion of the screen-rings into the space between the lower lugs B⁶ and the upper flange B⁵, said rings are provided on their peripheries with a plurality of vertically-alined notches $e$, equal in number to the lugs and located about the peripheries of the rings in a manner to correspond with the circumferential disposition of the lugs. In inserting said rings in place the rings will be turned to bring the notches in line with said lugs, which will permit the said rings to be raised upwardly into contact with the said flange B⁵, after which said rings will be given a slight rotation to bring the imperforate parts of the rings in line with said lugs, which will prevent the said rings from dropping downwardly out of place. The set-screws will thereafter be tightened to hold the said rings in proper contact with the flange B⁵.

A valve F is provided, which is located above the screen E and between the same and the filter-bed. Said valve is adapted to be closed when it is desired to remove the screen for the purpose of cleansing or repairing the same, so as to prevent the filter-bed from dropping downwardly into the interior of the supporting-column. The valve is substantially the same as the like parts shown in my said prior patent, being only different from that construction in its details. The valve consists of a horizontal sliding plate which slides on a flange $b^a$ within the column and projects at one end through a slot in the side wall of the column, so as to be connected with actuating means located outside of the column, by which it is moved into and out of its closing position. The means for moving said valve inwardly and outwardly consists of a screw-threaded shaft F', which has screw-threaded engagement with a tubular plug F⁴, which fits within the outer edge of the valve-plate. Said shaft is rotatively mounted in a casing F², which projects radially outwardly from the side walls from the column and provided with a space F³ of proper dimensions to receive the valve-plate F when in its outward or closing position. Said valve-plate is provided with a bore $f$, (indicated in dotted lines in Fig. 1,) into which the screw-shaft F' passes as the valve-plate moves outwardly. The valve-stem F' passes outwardly from said casing through a frame F⁵, which may be made integral with said casing, and the shaft is provided at its outer end with a hand-wheel F⁶, by which the shaft may be rotated. The shaft is provided inside of the outer part of the frame with a collar F⁷, which is stationary with the shaft and bears against the frame F⁵ in such manner as to take the outward thrust given to the shaft when the same is rotated to move the valve inwardly, and the hub $f'$ of the hand-wheel F⁶ serves as a shoulder to take the inward thrust brought on said shaft when the valve is being moved outwardly by rotation of said screw-shaft. A stuffing-box is provided between the casing F² and the shaft to afford a water-tight joint between said parts. The advance and side edges $f^2$ of said valve are inclined, as shown in Fig. 1, so as to shift the granular filtering material resting thereon upwardly out of its path when the valve is moved into its closing position.

The column is provided at one side thereof, near the screen, with an opening G, which is closed by a removable door G', secured to the column in any suitable manner, and through which opening access may be had to the interior of the column for the purpose of cleaning the screen or for the purpose of removing and replacing the screen. Said opening also affords access to the sand-trap at the lower end of the column, through which the sand caught therein may be removed. As a convenient construction the column is made of two parts joined near the screen, and said parts are provided with overlapping annular radially-extending flanges $b^4$, through which holding-bolts $b^5$ pass to clamp said parts together.

When it is desired to remove the screen for the purpose of cleaning or repairing the same, the valve will be closed, after which the screen may be removed by partially rotating the clamping-rings to bring the notches therein in line with the lugs, at which time said screen and holding-rings may be removed from the tubular column through the opening G. Said screen may obviously be cleaned without removing the same—as, for instance, by means of a brush or the like introduced through the opening G and brought into contact with the bottom of the screen.

The lower or reduced end of the tank is filled with a filtering medium which is coarser than the upper part of the bed—such, for instance, as pebbles or the like C'—which rest partly on the screen and extend slightly above the conical part of the tank. Said coarser medium is separated from the part C of the bed by means of a screen $C^2$ of such character as to prevent the pebbles from rising upwardly out of place when the filter is being washed by reversing the water therethrough. In case the reverse-current be under a low pressure said screen may be omitted. Said layer of coarse filtering material extends slightly above the conical part of the tank, so that the slight loss from the bottom thereof occasioned by the removal of the screen (which will occur only at infrequent intervals) will not bring the upper surface of this part of the bed below the cylindric part of the tank. The purpose of such layer of coarse filtering material is to more effectively deflect the water through the bed when the bed is being washed by the reverse-current, the presence of such medium acting to deflect the water outwardly, so as to come in contact with all parts of the superposed bed.

The general form of filter herein shown, whether made as a pressure or gravity acting filter, constitutes a very convenient individual filter, which may be made of any size desired up to the limit at which it is practicable to make a single screen. Such individual filter is suitable for use in restaurants, hotels, or in large office-buildings, where the same may be connected with the water-inlet pipe, so as to filter all or a part of the water used at such places, and the construction of the filter is such that it takes up a minimum amount of room compared to its filtering capacity.

The main or principal feature of my invention—to wit, the combined screen and supporting-column—may be embodied in a filter of large area, either of the pressure or gravity type, and having a plurality of screens, and the broader claims are not limited to the individual filter illustrated.

I claim as my invention—

1. In a filter, a tank for a granular filter-bed provided with a discharge-opening, a tubular supporting-column for said tank with which said discharge-opening communicates, a screen between the filter-bed and the lower end of the column, said lower end of the column being constructed to afford a filtered-water chamber and a sand-trap, and provided with an opening affording access to the sand-trap.

2. In a filter, a tank for the granular filter-bed provided with a discharge-opening, a tubular supporting-column for the tank provided with effluent-orifice and means between the screen and effluent-orifice permitting access to the screen.

3. In a filter, a tank for the granular filter-bed provided with a discharge-opening through which the water passes from the filter-bed, a tubular column beneath said opening and supporting that part of the tank and filter-bed located above the same, a screen removably contained within said column and means for maintaining said filter-bed substantially intact while permitting the screen to be removed.

4. In a filter, a tank for the granular filter-bed provided with a discharge-opening through which the water passes from the filter-bed, a tubular column beneath said opening and supporting that part of the tank and filter-bed located above the same and a screen removably contained within said column, said column being constructed to afford access to the screen for the purpose of cleaning or removing the same.

5. A filter comprising a tank having a discharge-opening at its bottom, a hollow supporting-column, a screen removably contained within said column, and means located closely adjacent to the screen for shutting off the filter-bed from the screen.

6. A filter comprising an upright tank having an opening at its bottom, a hollow supporting-column, a screen removably contained within said column, means for closing said column above said screen, said column being provided below said screen with an opening, and a closure for said opening.

7. A filter comprising a tank, a hollow supporting-column therefor, a screen contained within said column, inlet and outlet pipes connected with the lower end of the column, a raw-water-inlet pipe passing through the lower wall of the filter and upwardly through the filter-bed with its upper end located above the filter-bed, a valve in said inlet-pipe, and a wash-water-outlet pipe connected with said inlet-pipe and provided with a valve.

8. A tubular screen-holder for filters constructed to afford a support for that part of the filter located above the same and to afford access to the screen.

9. In a filter, a tank for the filter-bed, a tubular column screen-holder located thereunder and constructed to afford a support for that part of the filter located over the same, and a filtered-water-outlet pipe connected with said column a distance above the bottom wall thereof.

10. A tubular screen-holder located beneath a filter-bed, a screen thereon, and a valve between the bed and screen, said valve consisting of a flat plate which is inclined on its upper surface at the front and side edges thereof.

11. The combination with a tubular screen-holder, a screen therein, and a frame supporting the screen, of vertically-separated radially-extending parts on the interior wall of the holder between which the screen-frame is locked.

12. The combination with a tubular screen-holder, a screen therein and a frame supporting the screen and surrounding the same, of a radial flange in said holder, a plurality of circumferentially-separated radial lugs below said flange said frame being provided with a plurality of marginal notches circumferentially disposed to correspond with the position of the lugs, and set-screws passing through the lugs and impinging against the screen.

13. A filter comprising a tank having a tapered lower end, a screen at the lower end of the tank in line with an opening in said tank, and a granular filter-bed within the tank, the part of said bed contained within the tapered portion of the tank being made of granules relatively larger than those composing the upper part, whereby water passing upwardly therethrough in washing the filter is laterally deflected so as to be distributed throughout all parts of the bed.

14. A filter comprising a tank having a tapered lower end, and an opening at the bottom of the same, a screen at the lower end of the tank in line with said opening, a granular filter-bed within said tank, the part of said bed contained within the tapered portion of the tank being made of relatively-large granules whereby water passing upwardly therethrough in washing the filter is laterally deflected so as to be distributed throughout all parts of the bed and a screen interposed between said larger granules and the part of the bed above the same.

In testimony that I claim the foregoing as my invention I affix my signature, in presence of two witnesses, this 13th day of March, A. D. 1900.

IRA H. JEWELL.

Witnesses:
WILLIAM L. HALL,
C. A. NEALE.